(12) United States Patent
Amirola

(10) Patent No.: US 6,520,526 B2
(45) Date of Patent: Feb. 18, 2003

(54) WHEEL LOCK FOR A WHEELCHAIR

(75) Inventor: Jose Angel Otaola Amirola, Orduña (ES)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 09/839,990

(22) Filed: Apr. 20, 2001

(65) Prior Publication Data

US 2002/0153207 A1 Oct. 24, 2002

(51) Int. Cl.$^7$ ................................................ B60T 1/04
(52) U.S. Cl. ..................... 280/304.1; 188/2 F
(58) Field of Search ................ 188/2 F; 280/250.1, 280/304.1; D12/131; 180/907

(56) References Cited

U.S. PATENT DOCUMENTS

| | | | | |
|---|---|---|---|---|
| 2,859,837 A | * | 11/1958 | Mize | ........................ 188/2 F |
| 4,320,818 A | | 3/1982 | Knoche | |
| 4,350,227 A | | 9/1982 | Knoche | |
| 4,560,049 A | | 12/1985 | Uchibaba et al. | |
| 4,570,756 A | | 2/1986 | Minnebraker et al. | |
| 4,749,064 A | | 6/1988 | Jinno et al. | |
| 4,838,387 A | | 6/1989 | Yoshigai | |
| 4,887,830 A | | 12/1989 | Fought et al. | |
| 5,174,418 A | | 12/1992 | Le et al. | |
| 5,355,977 A | * | 10/1994 | Kuschall | ..................... 188/2 F |
| 5,472,066 A | * | 12/1995 | Schillo et al. | .............. 188/2 F |
| 6,035,975 A | * | 3/2000 | Loewenthal | ................. 188/2 F |

FOREIGN PATENT DOCUMENTS

| | | | | |
|---|---|---|---|---|
| DE | 2532485 | * | 2/1977 | ................. 188/2 F |
| GB | 1243032 | * | 8/1971 | ................. 188/2 F |

* cited by examiner

Primary Examiner—Daniel G. DePumpo
(74) Attorney, Agent, or Firm—MacMillan, Sobanski & Todd, LLC

(57) ABSTRACT

A wheel lock for a wheelchair, where the wheelchair has a rear drive wheel, includes a housing adapted to be mounted on the wheelchair. The housing has two pivot points spaced apart in a forward/rearward direction. A wheel contact arm has a pivot shaft pivotally mounted about one of the pivot points. The wheel contact arm has a wheel engagement edge adapted to contact the rear drive wheel. The wheel lock also includes an actuation lever pivotally mounted about the other of the pivot points, and a linkage connecting the wheel contact arm and the actuation lever. The housing, the pivot shaft, the actuation lever and the linkage form a four bar linkage. Pivoting of the actuation lever causes pivoting of the wheel contact arm to engage the wheel contact edge with the rear drive wheel.

16 Claims, 4 Drawing Sheets

WHEEL LOCK FOR A WHEELCHAIR

TECHNICAL FIELD

This invention relates in general wheelchairs and, in particular, to wheelchair accessories. Most particularly, the invention relates to a wheel lock for wheelchairs.

BACKGROUND OF THE INVENTION

Wheelchairs are well known forms of transportation that increase the mobility of the physically impaired. Wheelchairs are typically relatively small, single-person conveyances that generally comprise a seat supported by a frame which, in turn, is supported by two opposed drive wheels and two front casters. Many manual wheelchairs are provided with wheel locks that are designed be actuated to engage the rear, drive wheels so that the wheels are prevented from rotating. Wheel locks are particularly useful to prevent the wheelchair from rolling on a sloped surface or to immobilize the wheelchair while the wheelchair user is accessing or exiting the wheelchair.

Conventional wheel locks usually comprise a contact bar pivotally mounted so that it can be swung into engagement with the resilient rear drive wheel on a manual wheelchair. The pivoting action is often adapted with a spring or other similar biasing device to urge the contact bar into contact with the tire during engagement. The wheel lock mechanism is usually mounted on the wheelchair frame, using a two-piece frame clamp to which is bolted a separate wheel lock mounting bracket. The conventional wheel lock mounting bracket further includes an actuation lever.

Despite the benefits of known wheelchair locking mechanisms, it would be advantageous if there could be developed a wheelchair lock that is simple and relatively inexpensive to manufacture. Wheelchair wheel locks are mounted on each side of the wheelchair, so that a left hand wheel lock unit and a right hand wheel lock unit are required for each wheelchair, and this necessitates an inventory of numerous parts. It would be beneficial if the number of individual parts required for assembly of the left hand and right hand wheelchair wheel locks could be reduced.

SUMMARY OF THE INVENTION

The above objects as well as other objects not specifically enumerated are achieved by a wheel lock for a wheelchair, where the wheelchair has a rear drive wheel. The wheel lock includes a housing adapted to be mounted on the wheelchair. The housing has two pivot points spaced apart in a forward/rearward direction. A wheel contact arm has a pivot shaft pivotally mounted about one of the pivot points. The wheel contact arm has a wheel engagement edge adapted to contact the rear drive wheel. The wheel lock also includes an actuation lever pivotally mounted about the other of the pivot points, and a linkage connecting the wheel contact arm and the actuation lever. The housing, the pivot shaft, the actuation lever and the linkage form a four bar linkage. Pivoting of the actuation lever causes pivoting of the wheel contact arm to engage the wheel contact edge with the rear drive wheel.

According to this invention, there is also provided a wheelchair including a frame, a rear drive wheel, and a wheel lock. The wheel lock includes a housing mounted on the wheelchair, the housing having two pivot points spaced apart in a forward/rearward direction. A wheel contact arm has a pivot shaft pivotally mounted about one of the pivot points. The wheel contact arm has a wheel engagement edge adapted to contact the rear drive wheel. The wheel lock also includes an actuation lever pivotally mounted about the other of the pivot points, and a linkage connecting the wheel contact arm and the actuation lever. The housing, the pivot shaft, the actuation lever and the linkage form a four bar linkage. Pivoting of the actuation lever causes pivoting of the wheel contact arm to engage the wheel contact edge with the rear drive wheel.

According to this invention, there is also provided a wheelchair including a frame, a rear drive wheel, a left hand wheel lock and a right hand wheel lock. Each wheel lock includes a housing mounted on the wheelchair, the housing having two pivot points spaced apart in a forward/rearward direction. A wheel contact arm has a pivot shaft pivotally mounted about one of the pivot points. The wheel contact arm has a wheel engagement edge adapted to contact the rear drive wheel. The wheel lock also includes an actuation lever pivotally mounted about the other of the pivot points, and a linkage connecting the wheel contact arm and the actuation lever. The housing, the pivot shaft, the actuation lever and the linkage form a four bar linkage. Pivoting of the actuation lever causes pivoting of the wheel contact arm to engage the wheel contact edge with the rear drive wheel.

Various objects and advantages of this invention will become apparent to those skilled in the art from the following detailed description of the preferred embodiments, when read in light of the accompanying drawings.

DETAILED DESCRIPTION OF THE INVENTION

Figure 1:
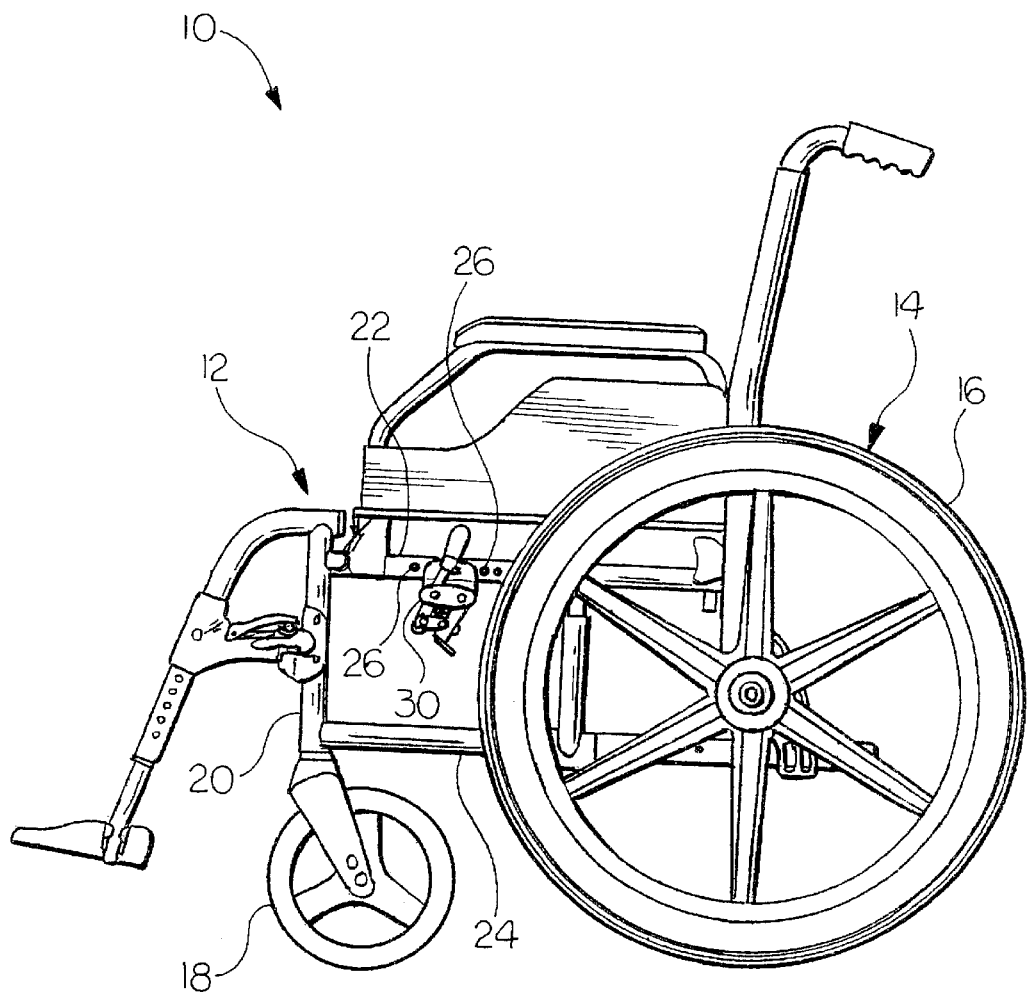
FIG. 1 is a schematic side view in elevation of a wheelchair that includes the wheel lock of the invention.
Figure 7:
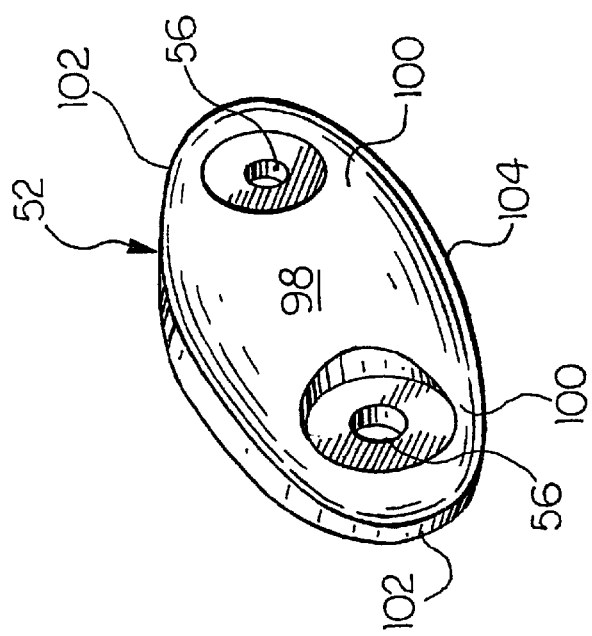
FIG. 7 is a perspective view of the end plate of the wheel lock housing.

As shown in FIG. 1, the wheelchair, indicated generally at 10, includes first and second side frame members 12, only one of which is shown in FIG. 1. Rear drive wheels 14, only one of which is shown in FIG. 1, are mounted for rotation with respect to the side frame members 12. The rear drive wheels include a resilient tire 16. Front caster wheels 18 are mounted on the side frame members 12 by means of a front tube 20. Numerous other mounting means can be used to mount the caster wheels 18. The side frame members 12 include the front tube 20, an upper side frame tube 22 and a lower side frame tube 24. The side frame members 12 can be of any design or shape, but they are preferably light weight and made of a strong material, such as aluminum or a composite material. The seat, seat cushion and seat back are not shown.

The upper side frame member 22 includes a plurality of spaced apart mounting holes 26. Mounted on the upper side frame tube 22 is the wheel lock 30. The wheel lock is attached to the upper side frame member 22 through one of the mounting holes 26, as will be explained is greater detail below. Because there are a series of the mounting holes 26 in the upper side frame tube, the wheelchair lock can be adjusted in the forward and rearward directions to be in the optimum position with respect to the rear drive wheel 14 and tire 16.

Figure 2:
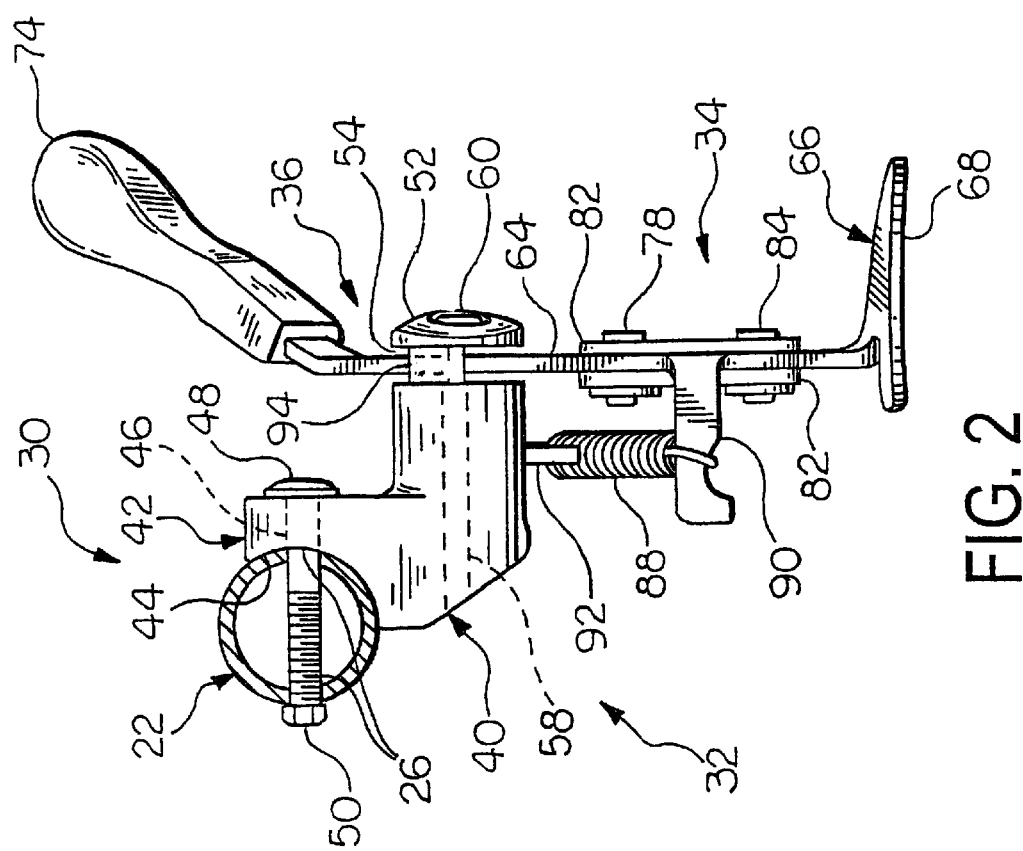
FIG. 2 is an elevational rear view of the wheel lock in the locked position.

As shown in FIG. 2, the wheel lock is generally comprised of a housing 32, a wheel contact arm 34 and an actuation lever 36. The housing includes a main body 40 and a mounting bracket 42. The mounting bracket 42 includes a tube receiving surface 44 that substantially matches the outside surface of the upper side frame tube 22. It is to be understood that although the upper side frame tube 22 is shown with a circular cross-sectional shape, the tube can have other cross-sectional shapes, such as a square cross-sectional shape. Whatever the shape of the tube 22, the tube receiving surface 44 will be made to conform to the outside contour of the tube.

Figure 3:
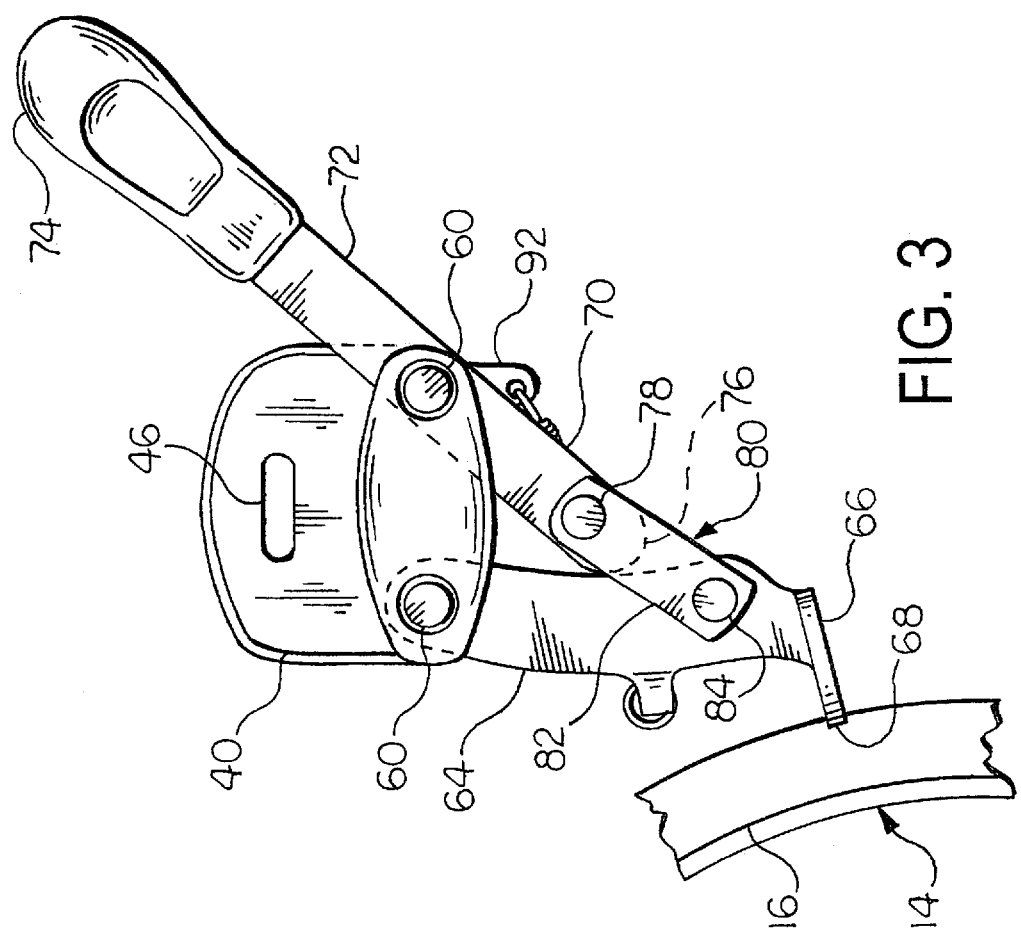
FIG. 3 is a laterally outside view in elevation of the wheel lock in the locked position.

As shown in FIGS. 2 and 3, the mounting bracket portion 42 includes an elongated slot 46 through which a fastener, such as a bolt 48 is inserted to connect the housing 30 to the tube 22 and wheelchair 10. The bolt 48 passes through the mounting holes 26 in the upper side frame tube 22, and is fastened by a nut 50. It can be seen from FIGS. 1 and 2 that the series of mounting holes 26 in the side frame tube 22 allow the bolt, and hence the wheel lock 30 to be adjusted forwardly and rearwardly with respect to the wheelchair 10. The fact that the slot 46 is elongated allows for a further forward and rearward adjustment to fine tune the position of the wheel lock with respect to the wheelchair.

The housing includes an end plate 52 that is spaced apart laterally from the main body 40 of the housing by a gap 54, as shown in FIG. 2. The end plate 52 includes two fastener holes 56 that are spaced apart in the forward and rearward direction. The main body 40 of the housing has corresponding holes 58 extending laterally through the housing. The main housing holes 58 act as pivot points for the pivotal mounting of the wheel contact arm 34 and the actuation lever 36. When rivets 60 (shown in FIG. 3) are inserted through the main housing holes 58 and the fastener holes 56 in the end plate, the contact arm 34 and the actuation lever 36 are mounted for pivotal rotation on the rivets 60

As shown in FIGS. 2 and 3, the wheel contact arm 34 includes a pivot shaft 64 and a wheel engagement arm 66. The pivot shaft 64 is pivotally mounted at its upper end in the gap 54. The wheel engagement arm 66 is provided with a wheel contact edge 68 that engages the tire 16 of the rear wheel 14 when the wheel lock is in the locked position. Ideally, the wheel contact edge 68 has a curved profile, as shown. It can be seen in FIG. 3 that pivoting the pivot shaft about the pivot point defined by the rivet 60 causes the wheel engagement arm 66 and wheel contact edge 68 engage the tire 16.

The actuation lever 36 includes a lower, linkage attachment end 70, an upper, handle attachment end 72, to which is attached a handle 74. The actuation lever has a pivot hole, not shown, through which a rivet 60 is inserted to pivotally mount the actuation lever 36 in the gap 54. The lower end 76 of the linkage attachment end 70 includes a linkage rivet 78 for a linkage 80. The linkage 80 includes a pair of laterally spaced apart links 82 that connect the wheel contact arm 34 with the actuation lever. One end of the linkage 80 is pivotally connected to the linkage rivet 84 on the pivot point shaft 64. It is to be understood that the linkage 80 could consist of a single link 82 rather than a the two links shown.

The housing 32, the linkage attachment end 70, the linkage 80, and the pivot shaft 64 form a four bar link. Since the housing 32 is fixed, pivoting of the actuation lever 36 will move the pivot shaft 64, thereby causing the engagement of the wheel contact edge 68 with the tire 16 and the rear drive wheel 14.

Figure 5:
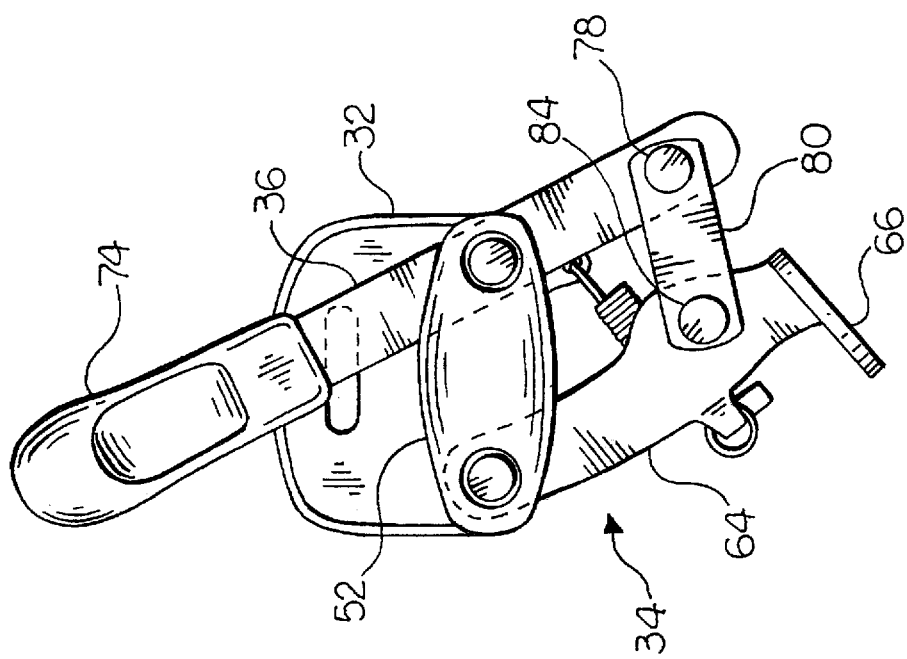
FIG. 5 is a laterally outside view in elevation of a left hand wheel lock in the unlocked position.
Figure 4:
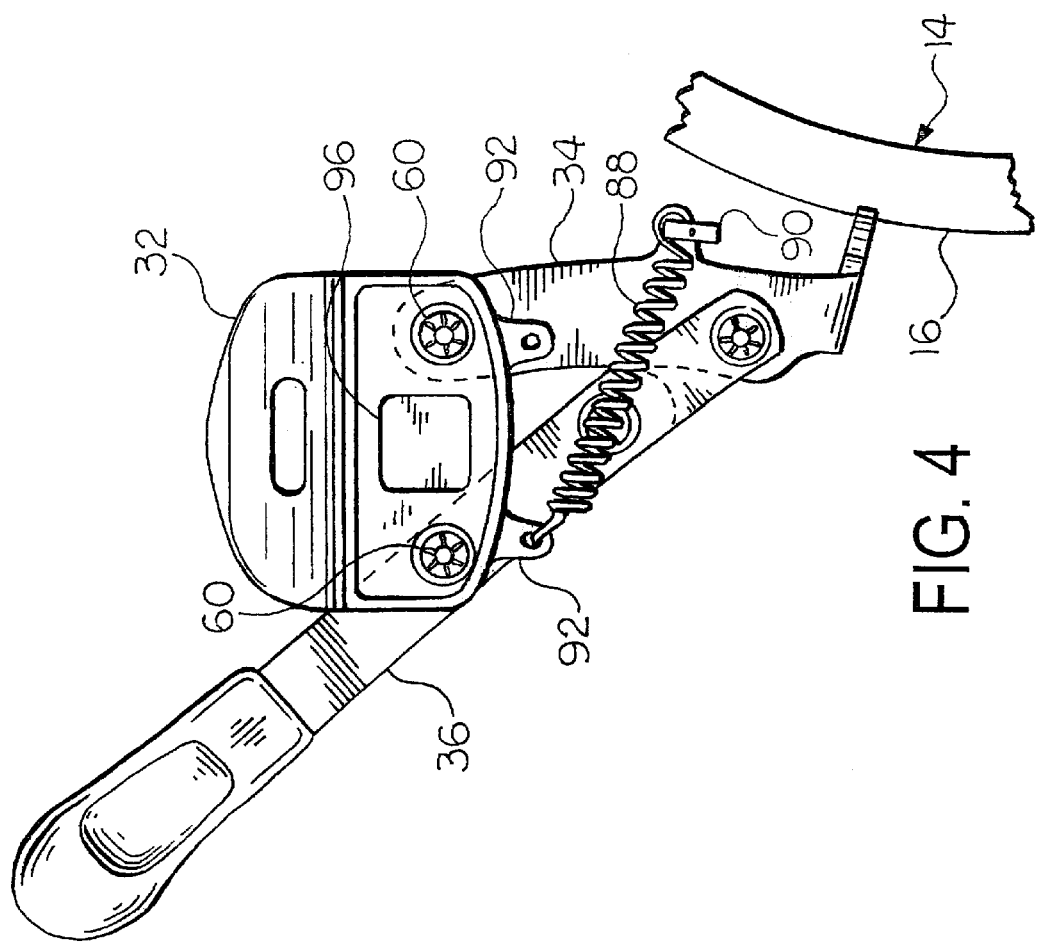
FIG. 4 is a laterally inside view in elevation of the wheel lock in the locked position.

A spring 88 is mounted between the housing 32 and the pivot shaft 64 to bias the four bar linkage to the open position of the wheel lock, shown in FIG. 5. The pivot shaft is provided with a spring arm 90 for attachment of the spring 88, as shown in FIG. 2. The housing 32 is provided with forward and rearward spring attachment lugs 92 for attachment of the spring. Both lugs 92 can be more clearly seen in FIG. 4. It can be seen that the four bar linkage is biased by the spring 88 to an open position whereby the wheel contact edge 68 is not in engagement with the rear drive wheel. Preferably, the connection between the pivot shaft 64, the actuation lever 36 and the linkage 80 form an over center toggle mechanism, whereby when the four bar linkage is in a closed position with the wheel contact edge 68 in engagement with the rear drive wheel, the spring 88 biases the four bar linkage to the closed position. Therefore, while the spring 88 normally biases the four bar linkage to the open position shown in FIG. 5, when the actuation lever 36 is actuated to close the four bar linkage so that the linkage 80 is in alignment with the linkage attachment end 70 of the actuation lever, the spring will bias the four bar linkage to the closed position shown in FIG. 3.

The housing 32 can be made of any suitable material, but is preferably made of a plastic material such as a nylon or polypropylene material. The housing can be made by a molding process, such as by an injection molding process, or by any other suitable method. When a molding process is used, the end plate 52 can be molded at the same time as the main body 40 and the mounting bracket portion 42 of the housing. When a molding process is used, the main body 40 of the housing can be provided with a hollowed out portion 96, shown in FIG. 4, to conserve material and save weight. The gap 54 between the end plate 52 and the main body 40 of the housing can be maintained by molding linking portions or connector ribs 94 into various portions of the gap. The connector ribs 94 must be positioned in locations that do not interfere with the pivotal operation of the wheel contact arm 34 and the actuation lever 36. In the preferred embodiment of the invention, the connector ribs consist of a central vertically oriented support rib, as shown at 94 in FIG. 2, and a pair of connecting pins 60, one of which is shown in FIG. 2. One of the connecting pins 60 is positioned at the forward end of the gap 54 and the other connecting pin is positioned at the rearward end of the gap.

The end plate 52 is preferably shaped with a rounded rectangular outline as shown in FIG. 3 and FIGS. 5–7, extending forwardly and rearwardly with respect to the wheelchair. The top or laterally outside surface 98 is provided with sloped end regions 100 so that the end plate 52 is thinner at its ends 102 than at its middle portion 104. Preferably, the end plate has smooth, rounded edges to avoid injury to the hands of the wheelchair user and to prevent damage to the wheelchair user's clothing.

Figure 6:
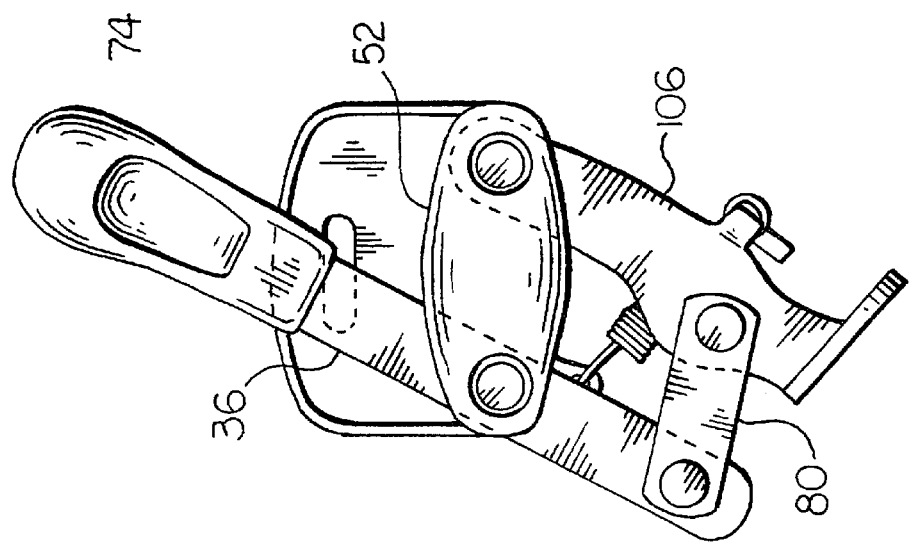
FIG. 6 is a laterally outside view in elevation of a right hand wheel lock in the unlocked position.

When providing wheel locks for wheelchairs, it is necessary to furnish both left hand and right hand wheel locks for the wheelchair. This requirement ordinarily would necessitate completely different, mirror image parts to be assembled for production of the two different wheel locks. One of the advantageous features of the wheel locks of the invention is that the housing 32, the actuation lever 36, the spring 88 and the linkage 80 are adapted to be used as either a left hand wheel lock or a right hand wheel lock. The contrast between the left hand wheel lock and right hand wheel lock can be seen by comparing FIGS. 5 and 6. The only element of the entire linkage that will be required to be different with respect to left hand and right hand is the wheel contact arm. The other parts are substantially identical for both the left hand and the right hand wheel locks. As shown in FIG. 6, the wheel contact arm 106 for the right hand wheel lock is a mirror image of the wheel contact arm 34 in FIGS. 3–5. This nearly universal parts design of the wheel lock 10 of the invention lowers manufacturing costs by requiring fewer individual parts.

The principle and mode of operation of this invention have been described in its preferred embodiments. However, it should be noted that this invention can be practiced otherwise than as specifically illustrated and described without departing from its scope.

What is claimed is:

1. A wheel lock for a wheelchair having a rear drive wheel, the wheel lock comprising:

a housing adapted to be mounted on the wheelchair, the housing having two pivot points spaced apart in a forward/rearward direction, and the housing having a main body and an end plate spaced apart laterally from the main body, thereby defining a gap suitable for pivotal mounting of the wheel contact arm and actuation lever wherein the end plate has a rounded rectangular outline and the end plate is thinner at its ends than at its middle portion;

a wheel contact arm having a pivot shaft pivotally mounted about one of the pivot points, the wheel contact arm having a wheel engagement edge adapted to contact the rear drive wheel;

an actuation lever pivotally mounted about the other of the pivot points; and a linkage connecting the wheel contact arm and the actuation lever;

wherein the housing, the pivot shaft, the actuation lever and the linkage form a four bar linkage, whereby pivoting of the actuation lever causes pivoting of the wheel contact arm to engage the wheel contact edge with the rear drive wheel.

2. The wheel lock of claim 1 in which the housing, actuation lever and linkage are adapted to be used as either a left hand wheel lock or a right hand wheel lock.

3. The wheel lock of claim 1 in which the four bar linkage is biased by a spring to an open position whereby the wheel contact edge is not in engagement with the rear drive wheel.

4. The wheel lock of claim 3 in which the connection between the pivot shaft, the actuation lever and the linkage form an over center toggle mechanism, whereby when the four bar linkage is in a closed position with the wheel contact edge in engagement with the rear drive wheel, the spring biases the four bar linkage to the closed position.

5. The wheel lock of claim 1 in which the housing includes a mounting bracket with a tube receiving surface.

6. The wheel lock of claim 1 in which the end plate is connected to the main body by at least one connector rib and at least one pin.

7. The wheel lock of claim 1 in which the housing has an elongated slot adapted for connection of the housing to the wheelchair, the elongated slot being oriented in forward and rearward directions, thereby providing forward and rearward adjustability of the wheel lock with respect to the wheelchair.

8. A wheelchair including a frame, a rear drive wheel, and a wheel lock, the wheel lock comprising:

a housing mounted on the wheelchair, the housing having two pivot points spaced apart in a forward/rearward direction, and the housing having a main body and an end plate spaced apart laterally from the main body, thereby defining a gap suitable for pivotal mounting of the wheel contact arm and actuation lever wherein the end plate has a rounded rectangular outline and the end plate is thinner at its ends than at its middle portion;

a wheel contact arm having a pivot shaft pivotally mounted about one of the pivot points, the wheel contact arm having a wheel engagement edge adapted to contact the rear drive wheel;

an actuation lever pivotally mounted about the other of the pivot points; and a linkage connecting the wheel contact arm and the actuation lever;

wherein the housing, the pivot shaft, the actuation lever and the linkage form a four bar linkage, whereby pivoting of the actuation lever causes pivoting of the wheel contact arm to engage the wheel contact edge with the rear drive wheel.

9. The wheelchair of claim 8 in which the housing, actuation lever and linkage are adapted to be used as either a left hand wheel lock or a right hand wheel lock.

10. The wheelchair of claim 8 in which the four bar linkage is biased by a spring to an open position whereby the wheel contact edge is not in engagement with the rear drive wheel.

11. The wheelchair of claim 10 in which the connection between the pivot shaft, the actuation lever and the linkage form an over center toggle mechanism, whereby when the four bar linkage is in a closed position with the wheel contact edge in engagement with the rear drive wheel, the spring biases the four bar linkage to the closed position.

12. The wheelchair of claim 8 in which the housing includes a mounting bracket with a tube receiving surface.

13. The wheelchair of claim 8 in which the end plate is connected to the main body by at least one connector rib and at least one pin.

14. The wheelchair of claim 8 in which the housing has an elongated slot adapted for connection of the housing to the wheelchair, the elongated slot being oriented in forward and rearward directions, thereby providing forward and rearward adjustability of the wheel lock with respect to the wheelchair.

15. The wheelchair of claim 8 in which the frame includes a series of mounting holes in the side frame tube, and the housing is mounted to the wheelchair with a fastener inserted through one of the mounting holes.

16. A wheelchair including a frame, a right hand rear drive wheel and a left hand rear drive wheel, a left hand wheel lock and a right hand wheel lock, each wheel lock comprising:

a housing mounted on the wheelchair, the housing having two pivot points spaced apart in a forward/rearward direction, and the housing having a main body and an end plate spaced apart laterally from the main body, thereby defining a gap suitable for pivotal mounting of the wheel contact arm and actuation lever wherein the end plate has a rounded rectangular outline and the end plate is thinner at its ends than at its middle portion;

a wheel contact arm having a pivot shaft pivotally mounted about one of the pivot points, the wheel contact arm having a wheel engagement edge adapted to contact a rear drive wheel;

an actuation lever pivotally mounted about the other of the pivot points; and a linkage connecting the wheel contact arm and the actuation lever;

wherein the housing, the pivot shaft, the actuation lever and the linkage form a four bar linkage, whereby pivoting of the actuation lever causes pivoting of the wheel contact arm to engage the wheel contact edge with the rear drive wheel; and wherein the housing, actuation lever and linkage of each of the left hand wheel lock and the right hand wheel lock are substantially identical.

* * * * *